United States Patent Office

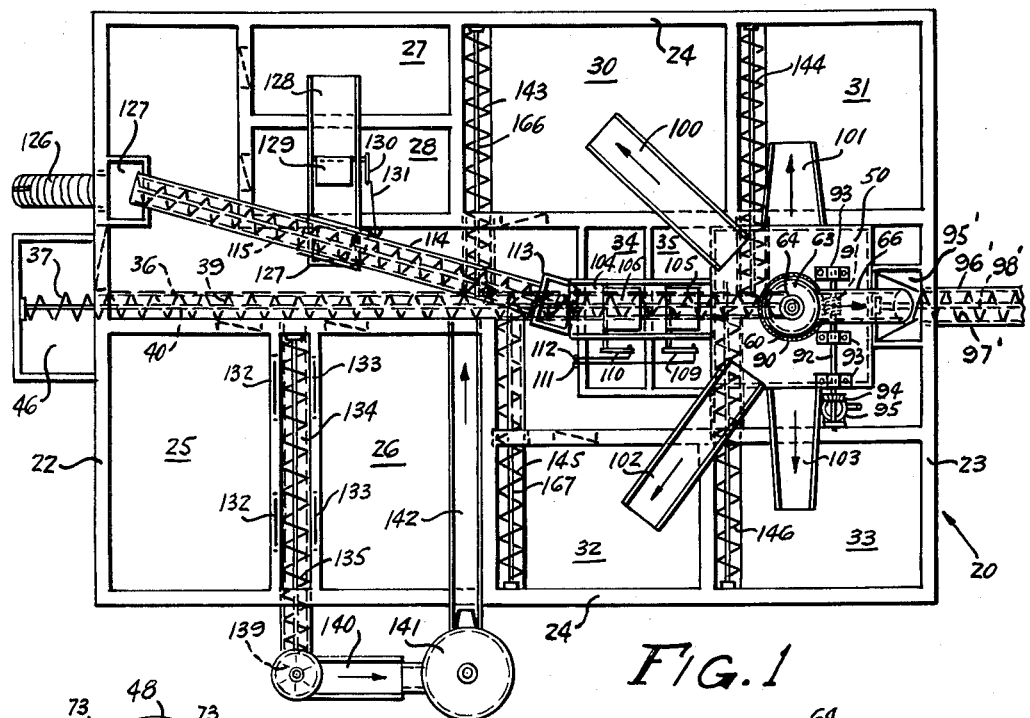
FIG. 1
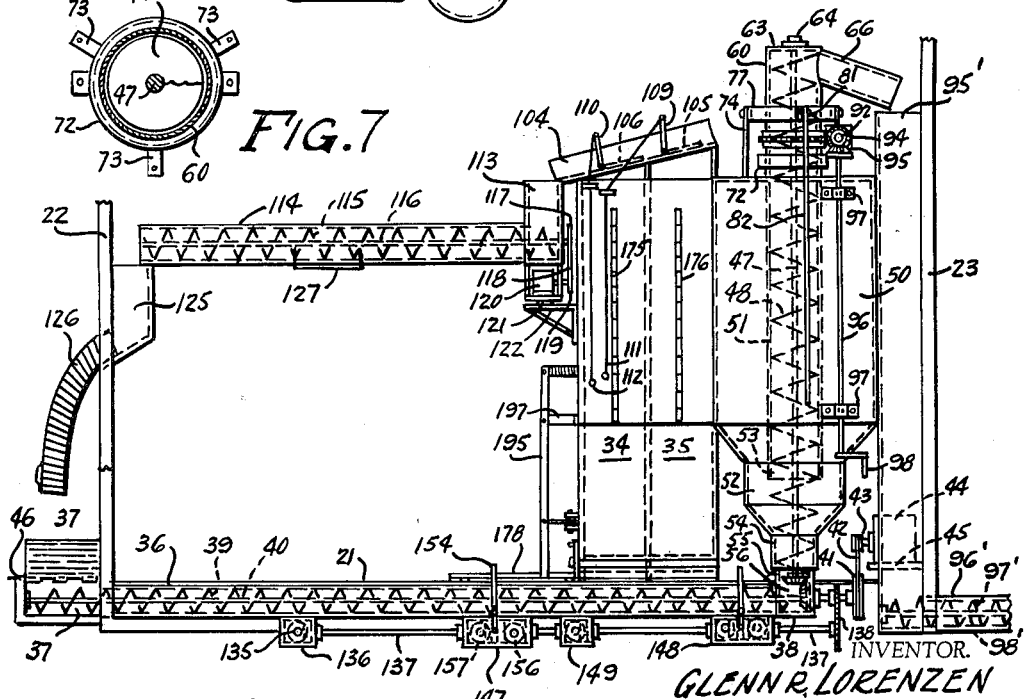
FIG. 7
FIG. 2
INVENTOR.
GLENN R. LORENZEN
BY
Kimmel & Crowell
ATTORNEYS.

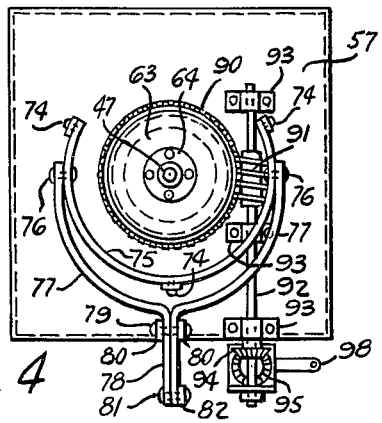
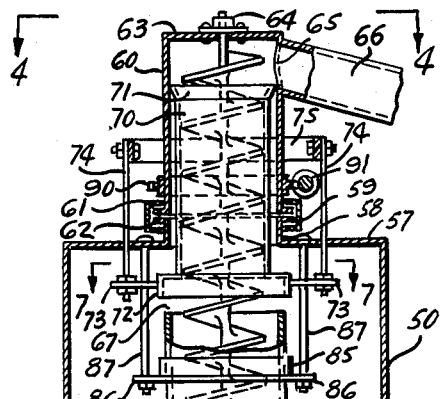
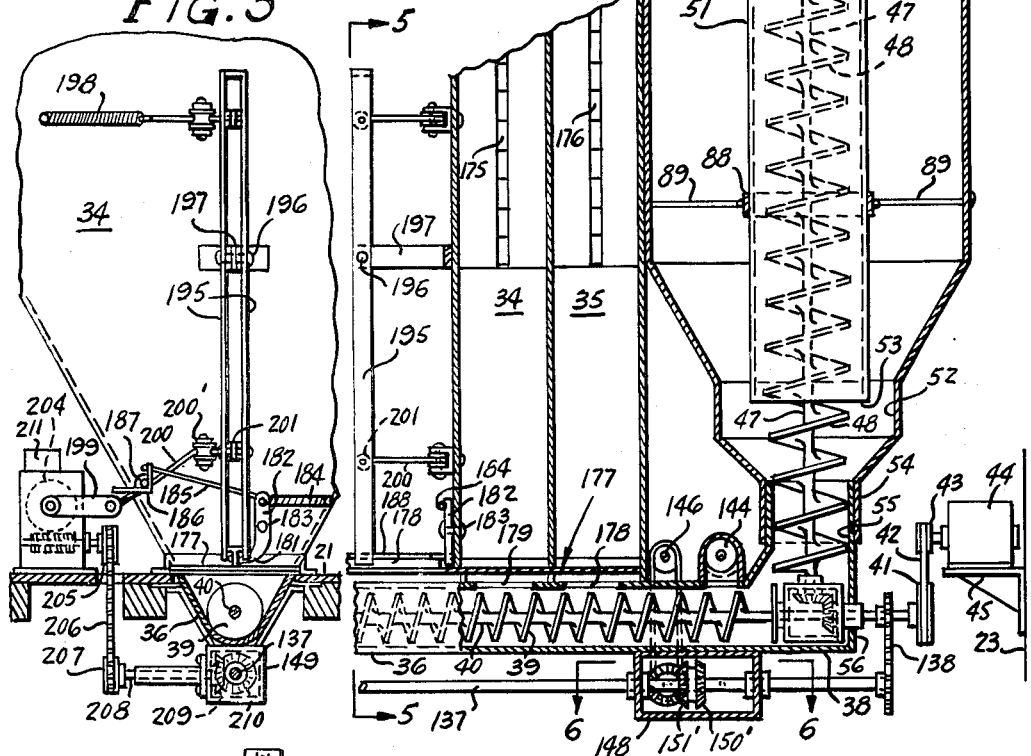
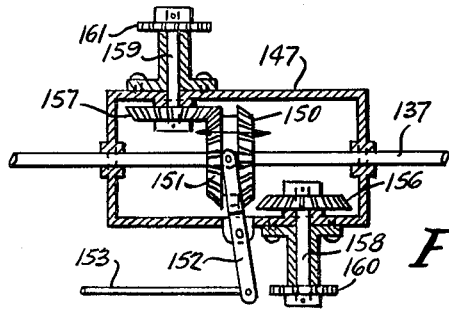
FIG. 4
FIG. 5
FIG. 3
FIG. 6
INVENTOR.
GLENN LORENZEN
BY Kimmel & Crowell
ATTORNEYS.

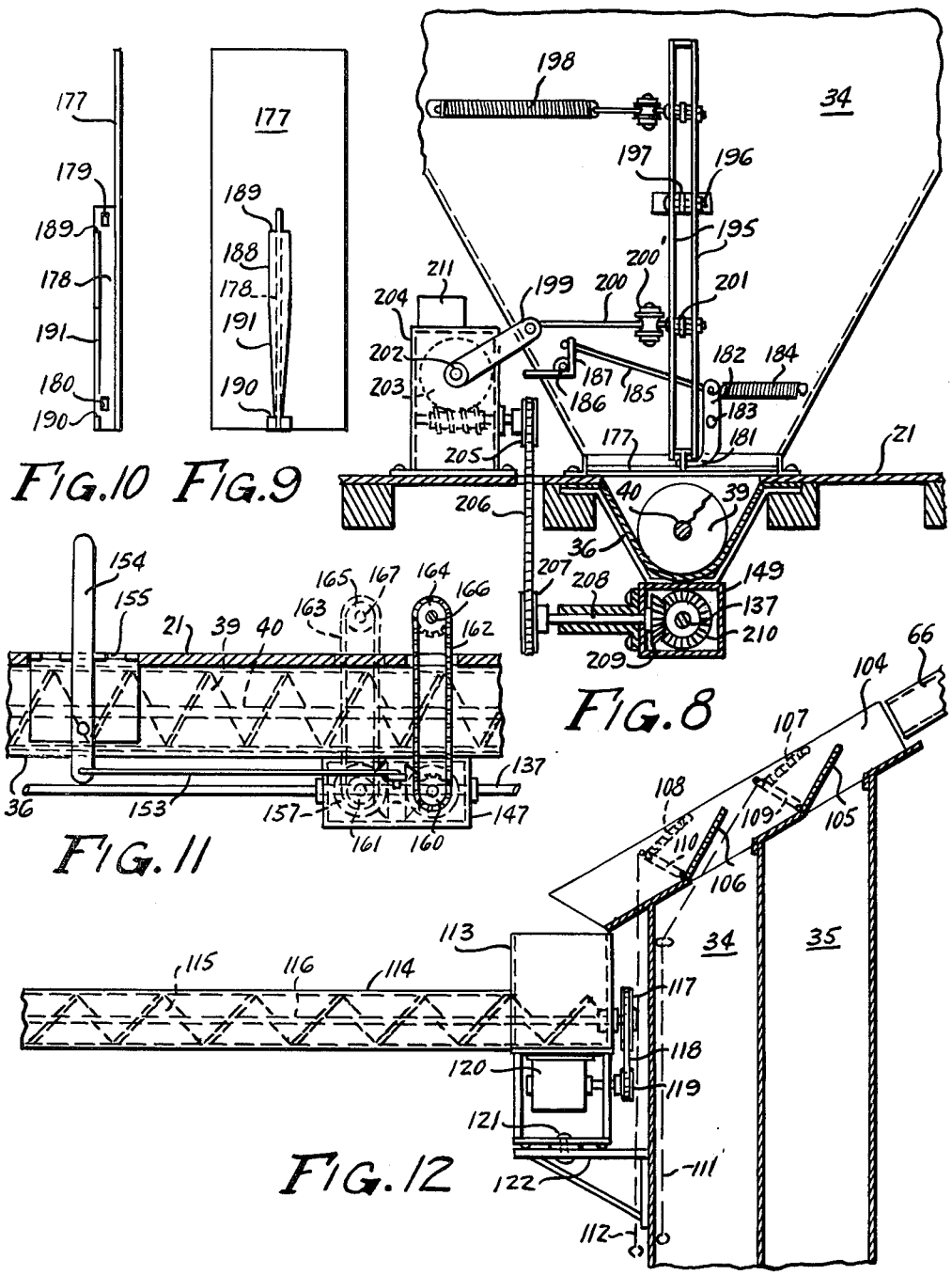

3,254,878
Patented June 7, 1966

3,254,878
APPARATUS FOR PROCESSING, STORING AND
DISTRIBUTING FEED FOR LIVESTOCK
Glenn R. Lorenzen, Arthur, Iowa
Filed May 28, 1964, Ser. No. 370,806
14 Claims. (Cl. 259—8)

This invention relates to an apparatus for processing, delivering and distributing feed for livestock and has as its primary object the provision of an improved apparatus which will convey feed from a source of supply through a mixer or agitator to storage bins within the building, from which the feed may be returned to the mixer, mixed with additional different feed, protein, or other ingredients required in the feeding of livestock, distributed to daily feed bins for immediate delivery, and then in turn distributed to the feeding troughs, either by means of manually controlled automatic conveying mechanisms, or at a predetermined future time.

A further object of the invention is the provision of an apparatus of this character whereby a desired quantity of feed may be premixed to a desired mixture, and then stored and delivered to the daily feed bins at required intervals.

Still another object of the invention is the provision of an apparatus wherein means is provided for supplying a different mixture of feed to different animals at substantially the same time.

A further object of the invention is the provision of an apparatus of this character including apparatus whereby the feed stored in the building may be passed through a grinder, and thence reconveyed to the mixer for admixture with other types or qualities of feed.

A further very important object of the invention is the provision of apparatus of this nature which will reduce the time and effort for feeding a quantity of livestock to a substantial minimum, and require a minimum of effort on the part of the individual caring for the stock.

Still another object of the invention is the provision of apparatus of this nature whereby after the morning feeding, for example, the apparatus may be set so that the evening feeding is automatically effectuated at the desired time without the necessity of manual intervention on the part of the operator.

A further object of the invention is the provision of an apparatus of this nature which is sturdy and durable in construction, reliable and efficient in operation, and relatively simple and inexpensive to manufacture, assemble, install, and operate.

Still other objects reside in the combinations of elements, arrangements of parts, and features of construction, all as will be more fully pointed out hereinafter and disclosed in the accompanying drawings wherein there is shown a preferred embodiment of this inventive concept.

In the drawings:

FIGURE 1 is a schematic top plan view showing one form of layout and apparatus incorporating elements of the instant invention.

FIGURE 2 is a side elevational view of the structure of FIGURE 1.

FIGURE 3 is an enlarged fragmentary vertical sectional view taken substantially along the center line of the mixer comprising an important element of the instant invention.

FIGURE 4 is a top plan view taken substantially along the line 4—4 of FIGURE 3.

FIGURE 5 is a fragmentary end elevational view taken substantially along the line 5—5 of FIGURE 3 showing a constructional detail.

FIGURE 6 is an enlarged fragmentary sectional view of one of the gear control boxes showing apparatus for selectively actuating one or another of the augers which supply feed from the several bins.

FIGURE 7 is a sectional view taken substantially along the line 7—7 of FIGURE 3 as viewed in the direction indicated by the arrows.

FIGURE 8 is an enlarged fragmentary view partially in elevation and partially in section disclosing constructional details of the automatic slide device for controlling the admission of grain to the main auger.

FIGURE 9 is a top plan view of the slide plate disclosed in FIGURE 8.

FIGURE 10 is a side elevational view of the plate.

FIGURE 11 is a fragmentary side view partially in section and partially in elevation showing the means for actuating the selective auger driving mechanism of FIGURE 6, and certain additional details; and FIGURE 12 is a side elevational view partially in section showing the actuation of certain of the closures for the daily feed bins comprising an element of the instant invention, as well as the piovtal mounting for a movable auger comprising an element of the instant invention.

Similar reference characters refer to similar parts throughout the several views of the drawings.

Having reference now to the drawings in detail, and more particularly to FIGURES 1 and 2, there is generally indicated at 20 a conventional building of any desired construction and convenient configuration, which illustratively includes a floor 21, front and rear walls 22 and 23, side walls 24 and a roof (not shown), of any desired construction. The interior of the building is divided by suitable partitions into a plurality of bins of any convenient arrangement, in the embodiment shown there being provided bins 25 and 26 for unmixed or unground feed, bins 27 and 28 for protein mix of different qualities and bins 30, 31, 32, and 33 which may contain feed which has been mixed and is ready for supply to the animals, the mixtures being either the same or different in accordance with the type of livestock being fed.

In addition, there are two bins 34 and 35 which comprise daily ration bins, and which will be described in detail hereinafter. A main feed trough or groove 36 is positioned substantially centrally of the building and extends the full length thereof from a point outside the front wall as indicated at 37 to a gear box 38, the trough containing a main feed auger 39 which is driven by means of a shaft 40, a pulley 41, belt 42, and pulley 43 from an electric motor 44 suitably mounted on a support 45 adjacent the rear wall 23. The auger 39 rotates in that direction to move feed from the end 37 which underlies an external hopper 46 in a direction toward the gear box 38. The gear box 38 drives a shaft 47 which is surrounded by a vertical lifting auger 48, which extends vertically through a mixing chamber 50, the latter having a a central tubular sleeve 51 therein surrounding the auger. The lower portion of mixing chamber 50 is reduced as at 52 adjacent the bottom 53 of the sleeve and further reduced as at 54 and fits over an upwardly extending tube 55 which extends around the gear box 38, the latter being contained in an enclosure 56 which comprises an extension of the main feed trough or channel 36.

As best shown in FIGURE 3, the top of mixer 50 is provided with a closure 57 which has a central opening surrounded by a flange 58 extending vertically in a horizontal flange 59. A rotatable cap 60 includes a lower flange 61, the flanges 59 and 61 being juxtaposed in an encircling collar 62 so the cap 60 may rotate relative to the top of the mixer. The cap 60 has a top 63 provided with a journal 64 in which seats the upper end of auger shaft 47. A side opening 65 extends to a spout or chute 66 which is inclined downwardly, and serves to convey mixed grain to desired locations in a manner to be described hereinafter.

The top of sleeve 51 is normally open as indicated at 67 so that grain carried upwardly by the auger 48 overflows the top and returns to the mixer 50 where it sinks to the reduced portions 52 and is reconveyed upwardly for thorough mixing. After the mixing has been completed, however, means are provided so that the grain is conveyed through a movable sleeve 70 having an upper flange 71 closely engaging the inner side of cap 60 just below the discharge chute 66 to be conveyed therefrom to a desired location. The movable sleeve 70 is seated on a collar 72 which is provided with radial projections 73 to which are secured rods 74 extending vertically upwardly. The upper ends of the rods 74 are secured to a substantially semi-circular collar 75, diametrically opposed side portions of which are pivotally secured as by pivots 76 (see FIG. 4) to a yoke 77, which has an arm extending therefrom as at 78 which is pivotally mounted as at 79 between lugs 80 extending upwardly from the top 57 of mixer 50. The outer end of arm 78 is pivotally connected as by a pivot 81 to an operating handle 82, the arrangement being such that manual movement of the operating handle 82, which extends downwardly adjacent the side of the mixer 50 as best shown in FIGURE 2, raises and lowers the collar 72 so as to either carry the grain to the discharge chute 66, or permit it to fall from the open outer end 67 of sleeve 51 back for remixing. The sleeve 51 is supported interiorly of mixer 50 by collar 85 which is provided in turn with radial lugs 86 to which are secured rods 87 which depend from the top 57 of mixer 50. An additional collar 88 surrounds an intermediate portion of sleeve 51 and is connected by suitable supports 89 to the interior sides of mixer 50.

Rotation of the cap 60 and hence discharge chute 66 is effectuated by means of a gear 90 which surrounds the cap at a suitable intermediate point, and which is engaged by a worm 91 mounted on a shaft 92 carried by suitable mounting brackets 93 on the top 57 of mixer 50. A shaft in its outer end carries a bevel gear 94 which in turn engages a second bevel gear 95 which is carried by a vertical shaft 96 supported in mounting brackets 97 secured to the side of the mixer, and which is adapted to be rotated by a hand crank 98 whereby the chute 66 may be rotated through 360° to discharge grain from the mixer to a plurality of desired points, as will be described hereinafter.

The primary discharge point for mixed feed comprises a hopper 95' which is positioned adjacent the rear wall 23 and which extends downwardly to a conveyor chute 96' within which is positioned a feeding auger 97' which conveys feed from the bottom of hopper 95' outwardly to the feed troughs arranged exteriorly of the building in any desired arrangement. The auger 97' may be driven, if desired, through a shaft 98' which is driven by a belt and pulley arrangement 99 from the motor 44, or may be supplied with power from any other desired source. Additional discharge chutes 100, 101, 102, and 103 are arranged radially at about the top of the mixer so that the discharge chute or tube 66 may be selectively directed thereto for filling respectively the bins 30, 31, 32, and 33.

An additional gravity chute 104 is positioned opposite hopper 95' and is provided with two pivoted doors 105 and 106 which are normally biased by means of springs 107 and 108 (see FIGURE 12) into closed position. The springs 107 and 108 are mounted on arms 109 and 110, each of which has connected thereto a rope 111 and 112, respectively, the ropes extending downwardly to a point adjacent the bottom of the feed bin so that pressure on rope 111 will open door 105 to direct feed into daily ration bin 35 while pulling on the rope 112 with the door 105 closed, will open door 106 to permit feed from chute 66 to fall into daily feed ration bin 34. If both of the doors are closed, however, feed from chute 104 will fall into a hopper 113 which covers the inner end of the distribution tube 114 which carries an auger 115 mounted on a shaft 116, the latter being driven by means of a pulley 117, a belt 118, and a pulley 119 carried by the drive shaft of a motor 120 which is supported by the underside of hopper 113. The entire assembly including the motor is pivotally mounted on a pivot 121 which is carried by a base 122 which is permanently fixed or mounted in any desired manner to the daily feed bin 34.

The free end of the pivoted chute 114 is normally supported on the upper edge of a raised hopper 125 from which a flexible discharge tube 126 extends exteriorly of the building and from which mixed grain may be conveyed to a loading wagon or the like as desired. When swung about pivot 121 the pivoted tube 114 may be employed to discharge mixed feed, or alternatively, feed directly from hopper 46 conveyed by auger 39 and auger 48 directly to chute 66 and thence back to pivoted auger 115, to bin 25. An intermediately positioned manually slidable sleeve 127 will permit grain conveyed by auger 115 through tube 114 to fall into bin 26 when the auger is swung in that direction, or alternatively, if protein is fed into the mixer it may be discharged by movement of the slide 127 into a gravity chute 128 and thence conveyed to bin 27. An intermediate door 129 controlled by a lever 130 and a manual operating cord 131 may be opened in chute 128 to permit the protein to fall directly into bin 28.

Feed stored in either bin 25 or 26 may be allowed to fall through manually controlled slides 132 and 133, respectively, into a lower trough 134 through which extends an auger 135. The auger 135 is driven through a gear box 136, which is in turn driven by a main shaft 137 which is geared as at 138 to the shaft 40 of main auger 39. The gear box 136 also drives a vertical auger 139 which conveys feed from either bin 25 or 26 to a gravity chute 140 from which it is conveyed to a grinder 141 extending from the grinder through a gravity trough 142 and returning to the main feed channel 36 from which it is conveyed by auger 39 back to the mixer for either mixing or distribution through chute 66 as previously described.

Additional augers 143, 144, 145, and 146 extend through suitable troughs in communication with the bottoms of mixed feed bins 30, 31, 32, and 33, respectively. These augers are mounted on the usual shafts, and augers 143 and 145 are driven from a dual gear box 147, while augers 144 and 146 are driven from a dual gear box 148. The energy supplied to these gear boxes comes through shaft 137, which also drives suitable gearing in a single gear box 149, which latter will be more fully described hereinafter. One of the dual gear boxes 147 is shown in detail in FIGURES 6 and 11. Here the box contains a pair of oppositely disposed bevel gears 150 and 151 which are rotated by shaft 137 from motor 44. The gears 150 and 151 are movable by a yoke 152 which is in turn shiftable by an operating rod 153, the latter being controlled by a manual operating lever 154 which extends through a suitable slot 155 in the floor 21. Normally, the gears 150 and 151 are centered but upon shifting of the yoke 152 in either direction, gear 150 or 151 will selectively engage bevel gears 156 or 157 which drive shafts 158 and 159, respectively, the latter in turn driving sprockets 160 and 161 which through chains 162 and 163 drive sprockets 164 and 165. These latter sprockets are in turn carried by the shafts 166 and 167 which drive augers 143 and 145, respectively. The arrangement of gear box 148 is substantially identical, and includes bevel gears 150' and 151' which are identical to the previously described bevel gears 150 and which are operated in the same manner on shaft 137.

The augers 143, 144, 145, and 146 when actuated all serve to convey feed from their associated bin wherein the mixed feed has been stored as dispensed by the chute 66 from mixer 50, back to the central or main trough 36 from which it is conveyed by augers 39 and 48 to just discharge chute 66 preferably for discharge into hopper 66 or alternatively into tube 115 for discharge into hopper 125 and thence to a wagon through the tube 126.

From the foregoing the operation of that portion of the apparatus so far described should be readily understandable.

Unmixed feed, such as oats, grain, or the like is dumped into hopper 46 and conveyed by auger 39 directly to mixer 50. It may then be conveyed when the sleeve 70 closes the top of sleeve 51, through chute 66 and chute 104 to pivoted tube 114, and discharged into either of bins 25 or 26. Alternatively, it may be mixed, if more than one type of feed is disposed in the hopper 46 at the same time by moving the sleeve 70 to open position, and after thorough recirculation through the mixer 50, by closure of the sleeve 60 through discharge chute 66 to any one of the bins 30, 31, 32 or 33. Similarly, by suitable actuation of any of the augers 143, 144, 145, 146, feed may be drawn from any of the bins 30, 31, 32, and 33 and run through the mixer, sleeve 70 being closed and discharge chute 66 into hopper 95' for direct distribution to the feeding troughs.

Protein may also, if desired, be dumped into the hopper 46 and conveyed through the central tube 51 of mixer 50 and sleeve 60 in discharge chute 66 and pivoted conveyor tube 114 to the protein bins 27 and 28. Normally since the admixture of concentrated protein is relatively small in contrast to the quantities of feed it is removed from bins 27 and 28 by hand and deposited in the mixer, although if desired, an additional auger feed similar to that discussed in connection with the other bins 30, 31, etc. may be employed if desired.

When a predetermined quantity of food for daily feeding is desired, either of daily ration bins 34 or 35 may be filled with previously mixed feed, or both as desired. These bins may be filled with the same or with different types of feed, in accordance with the livestock being fed, and the quantity of feed in each bin may be visually determined through a glass gauge 175 and 176 on the side of each bin 34 and 35, respectively. The distribution of feed from the bins 134 and 135 is controlled by a slide generally indicated at 177 which underlies both bins, and which covers openings 178 and 179 in the feed trough 36 overlying auger 39, so that as feed drops from the bins it is conveyed by the augers 39 and 48 of the discharge tube 66 and thence through hopper 95' to the external feed distributing tube 96'. The slide may, if desired, be manually controlled, although preferably timed means are provided for permitting the opening of the bottom of bin 34 at a predetermined time, and subsequently of bin 35.

The slide 177 is, as best shown in FIGURES 9 and 10, provided with a centrally disposed T-bar 178 having a pair of latch openings 179 and 180 in the sides thereof. These latch openings are adapted to be selectively engaged by a latch finger 181 which comprises the extremity of a latch 182 pivoted at 183, which is spring biased toward latching engagement by a spring 184 and which may be released therefrom by means of a rod 185 which is connected to a pivotally mounted L-shaped operating member 186, the latter being mounted on a pivot 187. The latch actuation will be described more fully hereinafter. The upper or horizontal flange 188 of the T-bar 178 includes a first shoulder 189 and a second shoulder 190, the flange 188 tapering inwardly as at 191 toward the shoulder 190. When the slide 177 is in enclosed position the latch finger 181 is engaged in latch opening 180 and a pair of spring pressed bars 195 engage the opposite sides of first shoulder 190. The bars 195 are pivotally mounted on a pivot 196 which is carried by an arm 197 extending laterally from the forward wall of bin 34 and normally biased by spring means 198 toward slide opening position. When the L-shaped trip member 186 is moved manually, for example, to release latch finger 181, the bars being engaged behind notch 190 will pull the slide 177 out from under bin 35 allowing it to empty and after the slide has been pulled out the latch finger 181 again becomes engaged in latch opening 179. Now as the arm 199 rotates clockwise, by means of cord 200 it pulls the bottom of the spring press bars 195 back along tapered surface 191 and then engages them behind shoulder 189. Then as arm 199 continues clockwise it engages trip member 186 which releases latch finger 181 thus permitting the spring press bars which are engaged behind notch 189 to pull the slide 177 out all of the way emptying bin 34. The daily ration bin can be measured from either bin 35 or bin 34 or both in accordance with the level to which either is filled.

Means are provided, however, for accomplishing the above operation automatically and at a predetermined time, and comprise an arm 199 which is connected by a cord 200 passing about a pulley 200' to a bolt 201 extending between the bars 195. The arm 199 is in turn mounted on a shaft 202 which extends from a reduction gear mechanism 203 in a reduction gear box 204. The reduction gearing which rotates the arm 199 is in turn driven through a sprocket 205 connected by a chain 206 to a sprocket 207 at the end of a shaft 208, which carries a bevel gear 209 engaging a bevel gear 210 mounted on shaft 137 in gear box 149. The engagement of the gears in the drive of sprocket 207 is effectuated by a manual control as previously described in conjunction with gear box 147.

After the morning feeding is accomplished and bins 34 and 35 have been filled with the proper rations arm 199 is then manually set in about the position as shown in FIGURE 8. The lever is actuated manually engaging the gears in gear box 149 in FIGURE 8. A conventional time clock 211 is then set so that the motor 44 will start at the desired time for the evening feeding, and the time clock is also set so that motor 44 will continue running for the necessary time to empty both bins 34 and 35. Then in the evening when the time clock comes on, the mechanism operates as described above.

The daily ration bins are, of course, filled from the chute 66 and the mixer 50 in the manner previously described in conjunction with the showing of the bins 30, 31, 32, and 33, the doors 105 and 106 being selectively opened by the manual control ropes 111 and 112 until the required amount of feed is in each bin.

From the foregoing it will now be seen that there is herein provided an improved apparatus for the processing, distribution, and storage of feed for livestock which accomplishes all of the objects of this invention, and others, including many advantages of great practical utility and commercial importance.

As many embodiments may be made of this inventive concept, and as many modifications may be made of the embodiments hereinbefore shown and described, it is to be understood that all matter herein is to be interpreted merely as illustrative, and not in a limiting sense.

I claim:

1. A feed processing storage and distribution apparatus comprising an enclosure having a plurality of bins therein, and a floor, a feed supply hopper exteriorly of said enclosure at the other end, a main feed trough extending from said feed supply hopper to the bottom of said mixer, a vertical tube open at its top and bottom in said mixer, a vertical tube open at its top and bottom in said mixer, a supply auger in said trough, a mixer auger in said tube, auxiliary troughs in the bottom of each bin, auxiliary augers in each auxiliary trough for directing feed from the bins to said main feed trough, power means for driving all of said augers, means for selectively connecting and disconnecting said auxiliary augers individually from said driving means, a rotatable cap aligned with said tube and the top of said mixer, a discharge chute carried by said cap exteriorly of said mixer, a second tube interiorly of said cap aligned with said first-mentioned tube and spaced from the open top thereof interiorly of said mixer, a sleeve slidable on said second tube, means for selectively moving said sleeve to open or close the space between said tubes to retain feed carried by said mixer auger to said mixer for recirculation when the space is open and to carry feed to the discharge chute when said space is closed, a plurality of gravity chutes positioned about said mixer leading to said bins, a discharge hopper adjacent said discharge chute, said discharge chute being rotatable by rotation of said cap to a point overlying a selected gravity chute or said discharge hopper, and means for carrying feed from said discharge hopper to feeding troughs exteriorly of said enclosure.

2. The structure of claim 1 wherein certain of said bins constitute daily ration supply bins and are located above said main feed trough, one of said gravity chutes overlying said bins, doors in the bottom of said one of said chutes and means for opening and closing said doors to direct feed from said discharge chute into a selected one of said daily ration supply bins.

3. The structure of claim 2 wherein slide means are provided underlying said daily ration supply bins which when opened permit the contents to flow into said main feed trough.

4. The structure of claim 3 wherein timed means are provided to open said slide partially to open one of said daily ration bins and then after a predetermined period fully to open another of said bins.

5. The structure of claim 4 wherein said timed means include a T-bar on said slide having a pair of shoulders therein, pivotally mounted spring biased arms engaging one of said shoulders, spring biased latch means holding said slide in closed position, a rotatable arm engageable with said latch means to release said slide to move to partially open position, to permit said spring biased arms to engage said second shoulder, a further rotation of said rotatable arm again releasing said latch means to release said spring biased arms to move said slide to fully opened position.

6. The structure of claim 5 wherein said rotatable arm is driven through a reduction gear box, and means are provided for releasably connecting said reduction gear box to the power means for driving said supply auger.

7. The structure of claim 6 wherein timer means are provided for automatically energizing said power means at a predetermined time.

8. The structure of claim 2 wherein a pivotally mounted conveyor tube is provided having one end beneath the discharge end of said one gravity chute, a power driven auger carried by said conveyor tube, and the free end of said conveyor tube may be selectively directed to one of a plurality of bins or to a loading hopper having an outlet exteriorly of the enclosure for loading feed.

9. The structure of claim 8 wherein said conveyor tube is provided with an intermediate opening and a slide covering therefor, opening of said slide covering permitting the supplying of feed to intermediately positioned bins.

10. The structure of claim 1 wherein said means for moving said sleeve slidable on said second tube comprises a ring partially surrounding said cap, rods extending through the top of said mixer connected to said sleeve, a yoke pivotally connected to said ring, an arm extending from said yoke pivotally mounted on the top of said mixer and an operating rod connected to said arm.

11. The structure of claim 1 wherein the means for rotating said cap comprises a ring gear surrounding said cap, a worm gear meshing with said ring gear, a shaft mounting said worm gear, a bevel gear on said shaft, a second bevel gear meshing with said first-mentioned bevel gear, a depending rod connected to said second bevel gear, and an operating crank carried by said depending rod.

12. The structure of claim 1 wherein said main supply auger includes a main auger shaft, and said power means includes an electric motor and a belt and pulley connection between said motor and said main auger shaft.

13. The structure of claim 12 wherein an auxiliary drive shaft is mounted below said main feed trough and connected to said main auger shaft by a chain and sprocket connection, and gear means are provided connecting said auxiliary augers with said auxiliary drive shaft.

14. The structure of claim 13 wherein said means connecting said auxiliary auger with said auxiliary drive shaft comprise gear boxes containing bevel gears, and the means for selectively connecting and disconnecting said auxiliary augers comprise lever means for shifting said bevel gears into and out of engagement with each other.

References Cited by the Examiner

UNITED STATES PATENTS

| | | | |
|---|---|---|---|
| 2,885,191 | 5/1959 | Hansen | 259—8 |
| 2,953,360 | 9/1960 | Kline | 259—97 X |
| 3,133,727 | 5/1964 | Luscombe | 259—8 |

WALTER A. SCHEEL, *Primary Examiner.*